(12) United States Patent
Heine et al.

(10) Patent No.: US 12,418,962 B2
(45) Date of Patent: Sep. 16, 2025

(54) SYSTEMS AND METHODS FOR ELECTRICALLY HEATING A CATALYST WITH A HONEYCOMB BODY HAVING RADIAL WALLS

(71) Applicant: CORNING INCORPORATED, Corning, NY (US)

(72) Inventors: David Robert Heine, Hammondsport, NY (US); Kunal Upendra Sakekar, Pune (IN); Avinash Tukaram Shinde, Pune (IN)

(73) Assignee: CORNING INCORPORATED, Corning, NY (US)

( * ) Notice: Subject to any disclaimer, the term of this patent is extended or adjusted under 35 U.S.C. 154(b) by 670 days.

(21) Appl. No.: 17/640,930

(22) PCT Filed: Sep. 9, 2020

(86) PCT No.: PCT/US2020/049895
§ 371 (c)(1),
(2) Date: Mar. 7, 2022

(87) PCT Pub. No.: WO2021/055199
PCT Pub. Date: Mar. 25, 2021

(65) Prior Publication Data
US 2022/0338307 A1    Oct. 20, 2022

Related U.S. Application Data

(60) Provisional application No. 62/900,984, filed on Sep. 16, 2019.

(51) Int. Cl.
*H05B 3/42* (2006.01)
(52) U.S. Cl.
CPC ......... *H05B 3/42* (2013.01); *H05B 2203/022* (2013.01); *H05B 2203/024* (2013.01)

(58) Field of Classification Search
None
See application file for complete search history.

(56) References Cited

U.S. PATENT DOCUMENTS

| 5,245,845 | A | 9/1993 | Langford |
| 5,259,190 | A | 11/1993 | Bagley et al. |

(Continued)

FOREIGN PATENT DOCUMENTS

| CN | 1669647 A | 9/2005 |
| CN | 101437600 A | 5/2009 |

(Continued)

OTHER PUBLICATIONS

Morofushi et al. JPH05293387A—translated document (Year: 1993).*

(Continued)

*Primary Examiner* — Jelitza M Perez
(74) *Attorney, Agent, or Firm* — Kurt R. Denniston

(57) ABSTRACT

An electrical heater and a method of heating a catalyst. The heater includes a honeycomb body that includes a honeycomb structure. The honeycomb structure includes a central axis extending longitudinally and a plurality of interconnected walls. The interconnected walls include a plurality of radial walls extending along a radius of the honeycomb body between the central axis and an outermost periphery of the honeycomb body and a plurality of angular walls arranged concentrically with respect to the central axis and spanning between the radial walls. The honeycomb structure includes a plurality of cells defined by the interconnected walls. The heater comprises a first electrode disposed at the central axis and a second electrode disposed radially outwardly of the central axis and in electrical communication with the first electrode via one or more of the intersecting walls that are located between the first electrode and second electrode.

18 Claims, 12 Drawing Sheets

(56) References Cited

U.S. PATENT DOCUMENTS

| | | | |
|---|---|---|---|
| 5,271,906 A * | 12/1993 | Yuuki | F01N 3/0871 |
| | | | 422/177 |
| 5,651,088 A | 7/1997 | Abe et al. | |
| 7,015,418 B2 | 3/2006 | Cahill et al. | |
| 8,158,908 B2 | 4/2012 | Konieczny et al. | |
| 8,257,460 B2 | 9/2012 | Komori et al. | |
| 8,604,811 B2 | 12/2013 | Kawase et al. | |
| 9,707,515 B2 | 7/2017 | Mase et al. | |
| 9,885,271 B2 | 2/2018 | Omiya et al. | |
| 9,976,466 B2 | 5/2018 | Takase et al. | |
| 2005/0170953 A1 | 8/2005 | Shirahata et al. | |
| 2006/0202115 A1 | 9/2006 | Lizotte et al. | |
| 2007/0020785 A1 | 1/2007 | Bruland et al. | |
| 2007/0231533 A1 * | 10/2007 | Aniolek | C04B 35/478 |
| | | | 428/116 |
| 2016/0346776 A1 | 12/2016 | Omiya et al. | |
| 2017/0252859 A1 | 9/2017 | Kumkar et al. | |
| 2018/0118603 A1 | 5/2018 | Nieber et al. | |

FOREIGN PATENT DOCUMENTS

| | | |
|---|---|---|
| CN | 202136986 U | 2/2012 |
| CN | 106029226 A | 10/2016 |
| DE | 202006015539 U1 | 12/2006 |
| EP | 0780148 A1 | 6/1997 |
| EP | 3282105 A1 * | 2/2018 ............ B01D 53/94 |
| JP | 05293387 A * | 11/1993 |
| JP | 3340860 B2 | 11/2002 |
| JP | 5261256 B2 | 8/2013 |
| JP | 2015-194119 A | 11/2015 |
| JP | 2017-031829 A | 2/2017 |
| JP | 6244264 B2 | 12/2017 |
| JP | 2018-008232 A | 1/2018 |
| WO | 2007/126712 A1 | 11/2007 |
| WO | 2018/012561 A1 | 1/2018 |

OTHER PUBLICATIONS

European Patent Application No. 19780500.5, Search Report, dated May 10, 2021; 10 pages; European Patent Office.

International Search Report and Written Opinion of the International Searching Authority; PCT/US2020/049895; Mailed Nov. 19, 2020; 12 Pages; European Patent Office.

Nazir et al., "Electrically Heated Catalyst (EHC) Development for Diesel Applications", International Journal of Automotive Engineering, vol. 6, 2015, 7 pages.

Chinese Patent Application No. 202080079279.0 , Office Action dated May 9, 2025, 5 pages (English Translation only), Chinese Patent Office.

* cited by examiner

SYSTEMS AND METHODS FOR ELECTRICALLY HEATING A CATALYST WITH A HONEYCOMB BODY HAVING RADIAL WALLS

CROSS REFERENCE TO RELATED APPLICATIONS

This is a national stage application under 35 U.S.C. § 371 of International Application No. PCT/US2020/049895, filed on Sep. 9, 2020, which claims the benefit of priority under 35 U.S.C § 120 of U.S. Provisional Application Ser. No. 62/900,984 filed on Sep. 16, 2019, the content of which is relied upon and incorporated herein by reference in their entireties.

BACKGROUND

This application generally relates to electrical heaters for heating a catalyst, such as a catalyst on a substrate of a catalytic converter assembly, and specifically, electrical heaters comprising radial honeycomb structures.

SUMMARY

All examples and features mentioned below can be combined in any technically possible way.

In some aspects, an electrical heater is provided. The electrical heater comprises a honeycomb body comprising a honeycomb structure comprising a central axis extending longitudinally therethrough and a plurality of interconnected walls, the interconnected walls comprising a plurality of radial walls, each radial wall extending at least partially along a radius of the honeycomb body between the central axis and an outermost periphery of the honeycomb body; and a plurality of angular walls arranged concentrically with respect to the central axis and spanning between the radial walls; and a plurality of cells defined by the interconnected walls; a first electrode disposed at the central axis; and a second electrode disposed radially outwardly of the central axis and in electrical communication with the first electrode via one or more of the intersecting walls that are located between the first electrode and second electrode.

In some embodiments, a radial distance between radially consecutive angular walls of the plurality of angular walls decreases in a radial proximity to the outer periphery of the honeycomb body such that a hydraulic diameter of each cell is substantially similar.

In some embodiments, a first group of the plurality of cells is in a first region directly adjacent to the central axis, wherein a second group of the plurality of cells is disposed in a second region radially outwardly of the first region, wherein a first hydraulic diameter of each cell of the first set of the plurality of cells is less than a second hydraulic diameter of each cell of the second set of the plurality of cells.

In some embodiments, each radial wall of a first cell of the plurality of cells is angularly offset with respect to the radial walls of a second cell of the plurality of cells that is radially adjacent to the first cell.

In some embodiments, the honeycomb body comprises a first resistive region separated from a second resistive region by a transitional angular wall, wherein the first resistive region comprises fewer radial walls than the second resistive region, the first resistive region being located nearer to the central axis than the second resistive region and both the first resistive region and the second resistive region being located between the first and second electrodes.

In some embodiments, the first resistive region and second resistive region are bounded by the transitional angular wall and one of the first electrode, the second electrode, or a second transitional angular wall.

In some embodiments, the radial walls of the first resistive region are proportionally thicker than the radial walls of the second resistive region, such that, when carrying current between the first and second electrodes, heat generated by each radial wall of the first resistive region is substantially equivalent to heat generated by each radial wall of second resistive region.

In some embodiments, the radial walls of the first resistive region are proportionally shorter than the radial walls of the second resistive region, such that, when carrying current between the first and second electrodes, heat generated by each radial wall of the first resistive region is substantially equivalent to heat generated by each radial wall of second resistive region.

In some embodiments, the radial walls of the first resistive region are proportionally axially longer than the radial walls of the second resistive region, such that, when carrying current between the first and second electrodes, heat generated by each radial wall of the first resistive region is substantially equivalent to heat generated by each radial wall of second resistive region.

In some embodiments, the radial walls are thicker than the angular walls.

In some embodiments, the second electrode is disposed at an outer skin disposed about the outer periphery of the honeycomb structure.

In some aspects, an exhaust treatment system is provided. The exhaust treatment system comprises an electrical heater according to any of the above and an exhaust treatment device positioned downstream of the electrical heater.

In some embodiments, the exhaust treatment device comprises a substrate loaded with a catalytic material, a particulate filter, or a combination In some aspects, a method for heating a catalyst is provided. The method comprises the steps of applying an electric potential difference across a first electrode located at a central axis of a honeycomb body and a second electrode located on the honeycomb body radially outwardly from the first electrode, wherein the honeycomb body comprises a plurality of intersecting walls comprising a plurality of radial walls, each radial wall extending at least partially along a radius of the honeycomb body between the central axis and an outermost periphery of the honeycomb body, at least some of the plurality of radial walls angularly spaced from each other about the central axis and a plurality of angular walls arranged concentrically with respect to the central axis and spanning between the radial walls, wherein the electric potential difference creates a flow of current through the intersecting walls located between the first electrode and the second electrode that generates resistive heating in the intersecting walls.

In some embodiments, a radial dimension of the cells of the plurality of cells decreases for each subsequent radially adjacent cell in radial proximity to the outer periphery of the honeycomb body such that a hydraulic diameter of each cell is substantially similar.

In some embodiments, a first set of the plurality of cells is disposed about the central axis, wherein a second set of the plurality of cells is disposed about the first set, wherein a first hydraulic diameter of each cell of the first set of the plurality of cells is less than a second hydraulic diameter of each cell of the second set of the plurality of cells.

In some embodiments, one or more radial walls of each cell in a first subset of the cells of the plurality of cells are respectively angularly offset with respect to the radial walls of each cell in a second subset of the cells of the plurality of cells that are radially adjacent to the first subset.

In some embodiments, the second subset of cells is separated from the central axis by at least two angular walls of the plurality of angular walls.

In some embodiments, the honeycomb body comprises a first resistive region separated from a second resistive region by a transitional angular wall, wherein the first resistive region comprises fewer radial walls than the second resistive region, the first resistive region being located nearer to the central axis than the second resistive region and both the first resistive region and the second resistive region being located between the first and second electrodes.

In some embodiments, the radial walls of the first resistive region are thicker than the radial walls of the second resistive region, such that the equivalent resistance of the first resistive region and the second resistive region are substantially similar.

In some embodiments, the radial walls of the first resistive region are shorter than the radial walls of the second resistive region, such that, when carrying current between the first and second electrodes, the heat generated by each radial wall of the first resistive region is substantially equivalent to the heat generated by each radial wall of the second resistive region.

In some embodiments, the radial walls of the first resistive region are axially longer than the radial walls of the second resistive region, such that, when carrying current between the first and second electrodes, the heat generated by each radial wall of the first resistive region is substantially equivalent to the heat generated by each radial wall of second resistive region.

In some embodiments, the radial walls are thicker than the angular walls.

In some embodiments, the second electrode is disposed at an outer skin disposed about the outer periphery.

In some embodiments, the catalyst is loaded on the intersecting walls.

In some embodiments, the method further comprises heating a flow of fluid with the heater and heating the catalyst with the flow of fluid.

The details of one or more implementations are set forth in the accompanying drawings and the description below. Other features, objects, and advantages will be apparent from the description and the drawings, and from the claims.

DETAILED DESCRIPTION

Some catalytic converters rely on the heat of engine exhaust to activate the catalyst in order begin treatment of vehicle emissions. However, a significant proportion of total emissions in some vehicles may occur immediately after starting the vehicle, while the catalyst is still cold. Embodiments disclosed herein pertain to active heating systems and methods that use electrical heating elements to supplement the existing heat of the engine exhaust, thereby enabling vehicle emissions to be further reduced, particularly after cold-start of the vehicle.

One such method for actively heating the exhaust is via an electrically heated catalyst (EHC) system, which raises the catalyst temperature by supplying electric power from a battery, e.g., the battery of the vehicle, to provide heat to the catalytic converter. Electrically heated catalyst designs, however, are affected by issues such as varying degrees of non-uniform heating profiles, which degrade performance and decrease the efficiency in electrical energy usage.

Figure 1:
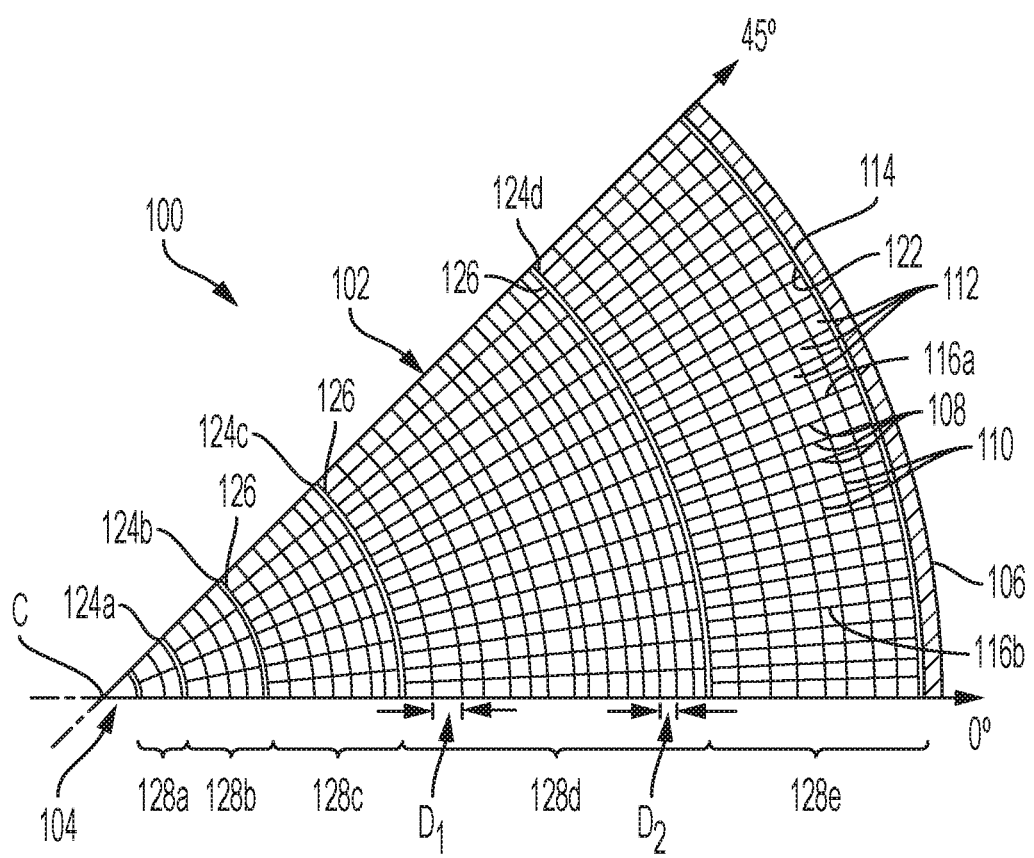
FIG. 1 depicts a partial cross-sectional view of an electrical heater having a radial honeycomb structure, according to an example.

FIG. 1 illustrates a cross-sectional octant of example electrical heater 100 for heating a catalyst. The electrical heater 100 comprises a honeycomb body 101 comprising a radial web honeycomb structure 102, a central electrode 104 located at a central axis C of the honeycomb structure 102, and at least one peripheral electrode 106 that is configured to cause a flow of current through an array of interconnected webs or walls comprised by the honeycomb structure 102. The interconnected walls comprise a plurality of radial walls 108 and a plurality of angular walls 110, which, together, define a plurality of cells or channels 112 that extend longitudinally though the honeycomb body 101.

The peripheral electrode 106 can be disposed to cause a flow of current through at least some of the radial walls 108 located between the electrodes 104 and 106 when a potential is applied between the central electrode 104 and the peripheral electrode 106. The peripheral electrode 106 can thus be disposed at an outer skin 114 (disposed about the outer periphery of the honeycomb structure 102) or can be embedded beneath the outer skin 114 at a location suitable for inducing current flow through at least a subset of radial webs 108 (e.g., at the outer periphery of the honeycomb structure). The honeycomb structure 102 can be comprised of an electrically conductive material, such as a metal, conductive ceramic, or combination thereof. The conductive material can have an electrical resistance such that conduction of current, as a result of the application of an electric potential across central electrode 104 and peripheral electrode 106, generates heat in the walls 108, 110 of the honeycomb structure 102. The potential applied to the central electrode 104 and peripheral electrode 106 can be formed by any suitable voltage source, and can, in alternate examples, be a DC voltage (formed, e.g., by a battery) or an AC voltage.

The honeycomb structure 102 of the honeycomb body 101 can be formed, for example, by extrusion of a ceramic forming material through an extrusion die as a green body, which is then cut, dried, and fired into a final ceramic honeycomb body. Alternatively, the honeycomb structure can be formed by an additive machining operation (e.g., such as three-dimensional printing) or subtractive machining operation (e.g., electrical discharge machining, electrochemical machining, etc.). If a ceramic material is selected that is too resistive to provide effective resistive heating, the ceramic material can be doped with a conductor, such as metal, to increase the conductivity of the ceramic. In an alternative example, the honeycomb structure can be formed entirely of a metal, rather than ceramic material, or can be formed from a conductive ceramic material.

In an example, the plurality of radial webs 108 extend radially between central axis C and the outer periphery of honeycomb structure (e.g., to outer skin 114), and together can define a plurality radial walls 116. As the plurality of radial webs 108 extend from the central axis C toward the outer periphery, angularly adjacent radial walls 108 will diverge from one another, thereby increasing the angular distance between adjacent walls 108 at the periphery of the honeycomb body 101. The plurality of angular walls 110 extend concentrically with respect to the central axis C, such that each angular wall 110 is an arc that is equidistant to the central axis along its length. Together define a plurality of angular walls 110 arranged concentrically about the central axis C. At least a subset of the radial walls 108 can terminate at the outer skin 114, forming an orthogonal joint 120 with an inner surface of outer skin 114. In an example, some of the radial walls 108 (e.g., radial wall 108a) can extend almost completely the radial distance between the central axis C of the honeycomb structure 102 and the outer skin 114, while other radial walls 108 (e.g., radial wall 108b) extend only through a one or more sections of the honeycomb structure 102.

In order to maintain a generally uniform cell density (e.g., number of cells per square inch) between, for example, radially inner and outer portions of the honeycomb structure 102, the number of radial walls 108 is varied at different radial positions. In some embodiments, the honeycomb structure comprises cell transitions 124 located at selected points along the radius of the honeycomb structure 102, with respect to which the number of radial walls is decreased at radial distances closer to the central axis C. At these cell transitions 124, the number of radial walls 108, and therefore the number of cells per unit length of the angular walls, is different on opposite radial sides of the cell transition. For example, the number of cells can be reduced by a designated amount, such as by ½, ¼, or ¼ (e.g., or doubled, tripled, quadrupled) or any other suitable amount. FIG. 1 illustrates an embodiment in which the number of cells 112, is halved at each cell transition 124 moving radially inwardly. For example, the number of cells 112 on the radially inward side of cell transition 124a in the octant of FIG. 1 is 2, while the number of cells 112 on the radially outward size of the cell transition 124a in the octant of FIG. 1 is 4. Likewise, moving radially outwardly, the number of cells 112 doubles from 4 to 8 on opposite sides of the cell transition 124b in the octant of FIG. 1. Each cell transition 124 can be defined by a particular one of the angular walls 110 located at each designated radial distance, which is referred to as a transitional angular wall 126 and emphasized for clarity in FIG. 1.

The cell transitions 124 can divide the honeycomb structure 102 into a plurality of resistive regions 128. Each resistive region 128 can comprise a plurality of cells 112 and be radially bounded on its sides by one of the cell transitions 124 and/or transitional angular walls, by the central electrode 104, by the skin 114, and/or by the peripheral electrode 106. For example, resistive region 128a is radially bounded on one side by cell transition 124a and on another side by central electrode 104. Similarly, resistive region 128d is radially bounded on one side by cell transition 124c and on another side by cell transition 124d. While four cell transitions and five resistive regions are depicted in FIG. 1, electric heater 100 can comprise other numbers of cell transitions, dividing the honeycomb structure into a corresponding number of resistive regions 128.

In order to maintain uniformity of the cross sectional area of the cells 112 in each of the resistive regions 128, the radial dimension (or radial length) of each cell (i.e., the distance between the radially adjacent angular walls 110 forming each cell) can change at different radial distances from the central axis C. For example, FIG. 1 shows radial dimensions D1 and D2 for two different cells 112 in the same resistive region but at different radial distances from the central axis C, which illustrates that the radial dimension decreases the closer in radial proximity to the skin 114. Reducing the radial dimension of the cells 112 in this way can be used to compensate for the angular widening of the cells 112 caused by the angular divergence between angularly adjacent radial walls 108 as they radiate from the central axis C of the honeycomb structure 102. In this way, the radial and angular dimensions of the cells can be varied in some embodiments in order to maintain a generally uniform hydraulic diameter of the cells 112 across the entire face of the honeycomb structure 102. In some embodiments, the hydraulic diameter of the cells 112 is within ±35% variation of each other across the entire face of the honeycomb structure 102.

Figure 2:
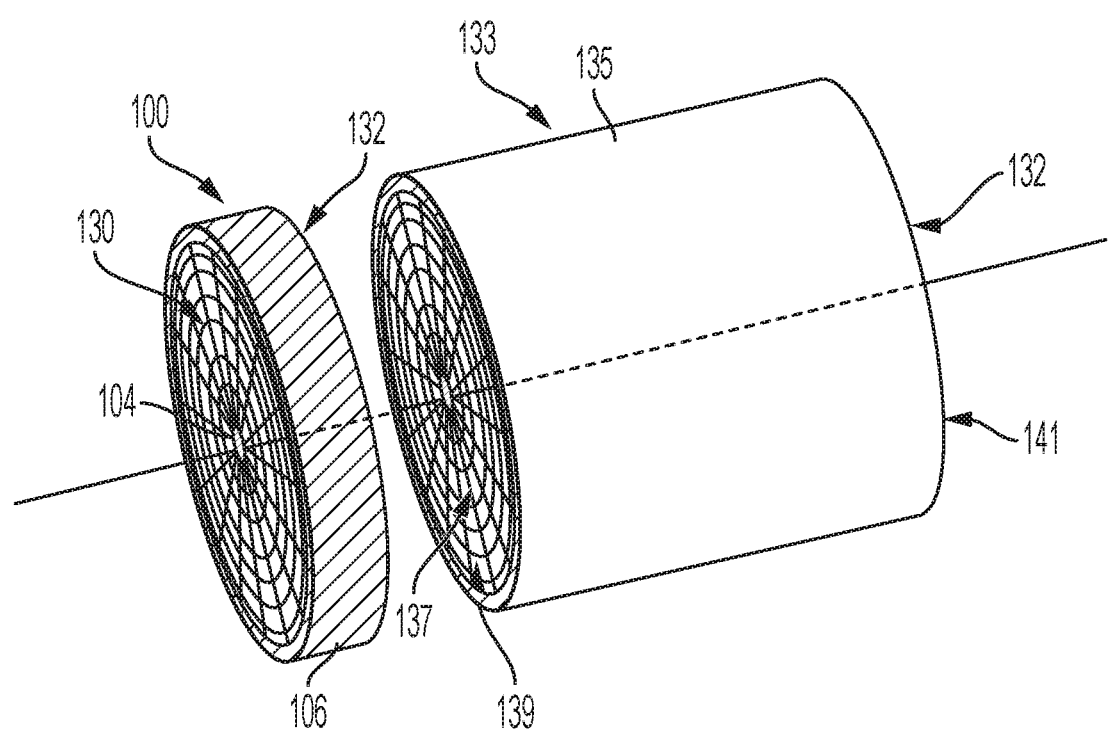
FIG. 2 depicts a perspective view of an electrical heater, according to an example.

FIG. 2 depicts a perspective view of the electrical heater 100, showing central axis C extending longitudinally through electrical heater 100, and peripheral electrode 106 disposed on the outer skin 114 of the honeycomb structure 102. While the example of FIGS. 1 and 2 are illustrated as having right-cylindrical outer shapes with a central axis C corresponding to an axis of rotation, in alternate examples, electrical heater 100 can be other shapes, such as those having an elliptical cross-section. In such embodiments, the honeycomb structure can be arranged with respect to multiple central axis, e.g., one for each focal point of an elliptical shape, with radial walls radiating from each focal point.

Electric heater 100 is configured to heat a flow of gas as the gas travels from inlet face 130 to outlet face 132. The honeycomb structure 102 can be coated with a catalyst to react with components of the gas (e.g., pollutants in an engine exhaust stream), and/or the catalyst can be included on a separate downstream treatment device (e.g., a honeycomb substrate loaded with the catalyst) that is heated by proximity to the heater 100 and by the flow of gas after the flow of gas is heated by the electric heater 100 The peripheral electrode can cover the entirety or only portions of the circumference of outer skin 114, as can be suitable for directing current to portions of the heater 100 and as will be discussed in more detail in connection with FIG. 14.

As shown in FIG. 2, heater 100 can be disposed upstream of an exhaust treatment device 133, such as a catalytic substrate, particulate filter, or partial filter. Similar to heater 100, exhaust treatment device 133 can comprise a honeycomb body comprising an outer skin 135 surrounding a honeycomb structure 137. For example, the exhaust treatment device 133 can be formed, for example, by extrusion of a ceramic forming material through an extrusion die as a green body, which is then cut, dried, and fired into a final ceramic honeycomb body. The ceramic forming material can comprise inorganics (e.g., alumina, silica, etc.), binders (e.g., methylcellulose), pore formers (e.g., starch, graphite, resins), a liquid vehicle (e.g., water), sintering aids, or any other additives helpful in the manufacture of the final ceramic honeycomb body. The final ceramic honeycomb body can comprise cordierite, aluminum titanate, alumina, mullite, silicon carbide, and/or other ceramic materials, or combinations thereof.

The honeycomb structure 137 of the exhaust treatment device 133 can comprise a plurality of intersecting walls, forming a plurality of contiguous cells. At least a subset of the cells of the exhaust treatment device 133 extend axially between opposing end faces 139, 141 of the exhaust treatment device 133 to define a set of channels through which a gas can flow. The inlet face 139, can thus be in fluid communication with the outlet face 141 via the channels, so that a gas, incident upon inlet end face 139 flow through the channels formed by the cells and exhaust outlet face 141.

The cells of the exhaust treatment device 133, in cross-section can be formed of any suitable shape, including, for example, square, rectangular, triangular, or hexagonal. The cells of the exhaust treatment device 133 need not be the same shape or dimension as the cells 112 of the heater 100. Indeed, the cells of the exhaust treatment device 133 can be larger or smaller, have a different cells per square inch (cpsi) than the cells 112 of the heater 100, and/or can be a different shape in cross-section. The honeycomb structure 137 can be impregnated or coated with a catalyst, that, when heated by the heater 100 (e.g., by proximity to the heater 100 and/or indirectly by an exhaust stream that is heated by heater 100), activates to react with the exhaust. In some embodiments, only the electric heater 100 is loaded with a catalytic material, only the exhaust treatment device is loaded with a catalytic material, or both the heater 100 and the exhaust treatment device 133 are loaded with catalytic materials.

The current generated in heater 100 serves to heat the flow of gas, e.g., vehicle exhaust stream, which flows through exhaust treatment device 133. Thus, the heater 100 heats the catalyst of the exhaust treatment device 133. In some embodiments, the heater 100 is dimensioned relatively to exhaust treatment device 133, so that heater 100 will heat relatively quickly in comparison to the exhaust treatment device 133. For example, a heater used with an exhaust treatment device 133 having an axial length of 6 in., can have an axial length of between about a quarter of an inch and an inch. If the heater 100 and exhaust treatment device 133 are constructed from different materials and/or with different cell geometries, the heater 100 and exhaust treatment device 133 can be extruded as a separate honeycomb bodies. However, in some embodiments, the heater 100 and the exhaust treatment device 133 can be combined by extruding a single honeycomb body (e.g., of a conductive ceramic material) and applying the electrodes 104, 106 directly to this single honeycomb body. In such an embodiment, the electrodes can be arranged to span only a portion of the axial length of this single honeycomb body.

As mentioned above, a potential applied between central electrode 104 and peripheral electrode 106 of FIG. 1 causes current to flow radially from central electrode toward peripheral electrode 106 (in alternative examples, current can flow from peripheral electrode 106 toward central electrode 104 as a result of the opposite potential applied between the central electrode 104 and peripheral electrode 106). However, at each cell transition 124, the current will be divided between the additional parallel radial walls 108 disposed on the outer side of the cell transition 124. If the number of radial walls 108 is doubled on the radially outer side of the cell transition 124 with respect to the inner side of the cell transition 124, the equivalent resistance on the radially outer side of the cell transition 124 is one half the resistance of equivalent resistance on the radially inner side of the cell transition 124 (assuming all other aspects of the radial and angular walls are equal). The resulting drop in equivalent resistance will create a corresponding drop in generated heat on the radially outer side of the cell transition, resulting in an undesirable non-uniform heat profile in the resistive regions featuring higher numbers of parallel radial walls 108.

Figure 3:
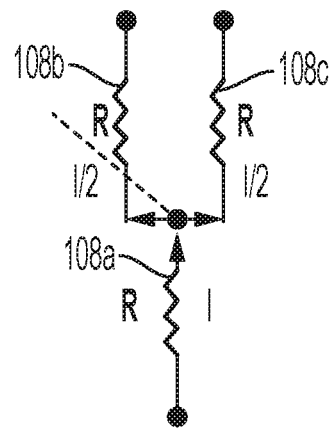
FIG. 3 depicts an equivalent resistance of radial walls of an electrical heater, according to an example.

FIG. 3 schematically depicts the equivalent resistance of a radial wall 108*a* of a radially inner resistive region at a cell transition (e.g., resistive region 128*c* with respect to cell transition 124*c*) to the radial walls 108*b*, 108*c* of a radially outer resistive region (e.g., resistive region 128*d* with respect to cell transitions 124*c*). As shown, in this example, the resistance R of each radial walls 108 is substantially equal. However, the current 112 traveling through each radial wall 108*b*, 108*c*, is half the current I traveling through radial wall 108*a*, because the current is divided equally between radial walls 108*b* and 108*c*. Accordingly, the heat generated by radial walls 108*b*, 108*c* of the outer resistive region 128 will be one quarter the heat generated by radial wall 108*a* of the inner resistive region. This can be demonstrated by the following equations:

$$Q_{inner} = (I)^2 * R \qquad (1)$$

$$Q_{outer} = \left(\frac{I}{2}\right)^2 * R \qquad (2)$$

where $Q_{inner}$ is the heat generated by radial wall 108*a* of the inner resistive region and $Q_{outer}$ is the heat generate by each radial wall 108*b*, 108*c* of the outer resistive region (the equation for heat generation is the same as the equation for power dissipated in each radial wall 108).

To mitigate the drop in resistance at each cell transition 124, the resistive region 128 on the radially inner side of the cell transition 124 can be modified to generate equivalent heat to the resistive region on the radially outer side of the cell transition 124 by changing the resistance of the radial walls 108 of the inner resistive region 128 with respect the outer resistive region 128. Examples are discussed with respect to FIGS. 4A-6.

Figure 4A:
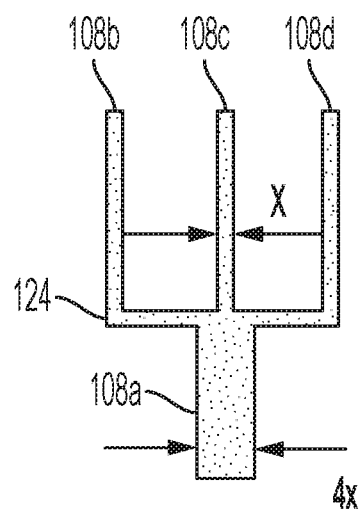
FIG. 4A depicts a simplified partial cross-sectional view of radial and angular walls of an electrical heater, according to an example.

FIG. 4A illustrates a simplified, partial cross-section view of one of the cell transitions 124 and radial walls 108*a*-108*d*, according to a first method for changing the resistance of the radial walls 108 of the inner resistive region 128 with respect to the outer resistive region 128, for a given one of the cell transitions 124. With respect to the portion of the cell transition 124 depicted in FIG. 4A, radial wall 108a is disposed in the inner resistive region 128, while radial walls 108b, 108c, and 108d are disposed in the outer resistive region 128. In this example, although three radial walls 108d, 108c, 108d, are shown for one radial wall 108a, this example doubles the number of radial walls 108d on the outer side of each cell transition 124.

Figure 4B:
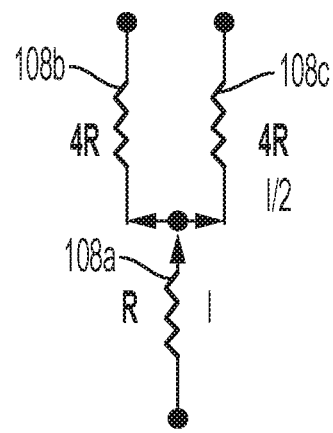
FIG. 4B depicts an equivalent resistance of radial walls of an electrical heater, according to an example.

As shown in FIG. 4A, in order change the resistance of the radial walls 108, the wall thickness on the inner side of the cell transition 124 is increased, such that the heat generation on either side of the cell transition is substantially similar. For example, if but for the increase in thickness of the radial wall 108 each radial wall 108 on the outer side of the cell transition 124 would generate one quarter the heat of the radial wall 108 on the inner side of the cell transition 124, the thickness of the radial wall 108 of the resistive region 128 on the inner side of the cell transition 124 can be increased by fourfold with respect to the thickness of each radial wall on the outer side of the transition region 124. This is shown in FIG. 4A, where the thickness of radial wall 108a, being located on the inner side of the depicted cell transition 124 is represented as 4X and the thickness of radial walls 108b-108d, being located on the outer side of cell transition 124 is represented as X. As shown in FIG. 4B radial wall 108a due to its thickness will have a resistance of some value R, whereas radial walls 108 will have a resistance of 4R. As a result, the heat dissipated $Q_{inner}$ by radial wall 108a, located on the inner side of a cell transition 124, will be given by equation (1). Whereas, because radial walls 108b-108c will receive half the current flowing through radial walls 108, the heat generated by each radial wall 108b-108c, being located on the outer side of cell transition 124, can be given by eq. (3):

$$Q_{outer} = \left(\frac{I}{2}\right)^2 * 4R = Q_{inner} \quad (3)$$

Accordingly, the heat generated at each radial wall 108 will be substantially similar, promoting a uniform heat profile throughout resistive regions 128.

The thickness required to achieve uniform heating will depend, in part, on the ratio of the number of radial walls 108 in the outer resistive region 128 to the inner resistive region 128. Generally speaking, all other aspects of the radial walls 108 being equal, the relative thickness of the radial walls 108 of the inner resistive region 128 will be equivalent to the inverse of the square of the ratio of the number of radial walls 108 of the outer resistive region 128 to the number of radial walls 108 of the inner resistive region 128, due the equation for heat generation by each radial wall 108. Thus, if there are three times as many radial walls 108 on the outer side of cell transition 124 as radial walls 108 on the inner side of the cell transition 124, the radial walls 108 on the inner side of the cell transition 124 should be nine times as thick as the radial walls 108 on the outer side of the cell transition 124. More generally, as other aspects of the radial walls 108 can vary (e.g., length, axial length, material, etc.), the thickness of the relative thickness of the radial walls 108 of the inner resistive region 128 will be equivalent to the inverse of the square of the ratio of the current flowing through each radial wall 108 on the outer side of cell transition 124 to the current flowing through each radial wall 108 on the inner side of cell transition 124. Thus, in the example of FIGS. 4A and 4B, because half the current is flowing through the radial walls 108b-108d, radial wall 108a is four times as thick as radials walls 108b-108d.

Figure 5:
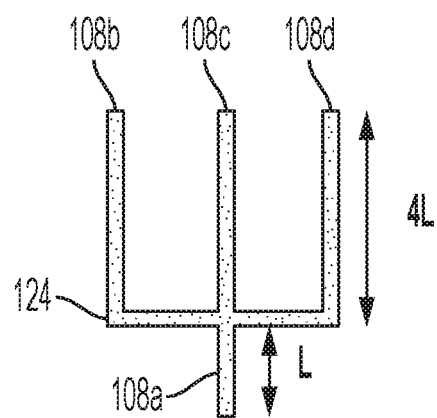
FIG. 5 depicts a simplified partial cross-sectional view of radial and angular walls of an electrical heater, according to an example.

FIG. 5 illustrates a simplified, partial cross-section view of a cell transition 124 and radials walls 108a-108d according to a second embodiment for changing the resistance of the radial walls 108 of the inner resistive region 128 with respect to the outer resistive region 128, for a given cell transition 124. According the second embodiment, the length of the radial walls 108 on the inner side of the cell transition 124 are shortened, such that the resistance of each radial wall 108a on the inner of cell transition 124 is some fraction of the resistance each radial wall 108b-108d on the outer side of cell transition 124. This example modifies the lengths of the radial walls 108 to vary the resistances of each the resistance of each radial wall 108 will increase with length. For example, if the radial walls 108 are doubled at the cell transition 124 on the outer side, the radial wall 108 on the inner side of the cell transition 124 can be shortened to one quarter of the length of the radial walls 108 on the outer side of the cell transition 124. Thus, as shown in FIG. 5, the radial wall 108a on the inner side of the cell transition 124 is length L, and the radial walls 108 on the outer side of the cell transition are length 4L. Thus, returning to the example of FIG. 1, if this embodiment were followed, the length of radial walls of resistive region 128c, for example, would be modified to be four times as long as the radial walls 108 of resistive region 128d. Like the example of FIG. 4B, the resistance of radial wall 108a on the inner side of cell transition 124 will be of a resistance R, while the resistance of each radial wall 108b-108d on the outer side of cell transition 124 will each be of a resistance 4R. The heat generated by each resistive region 128 can, therefore, be calculated by Eq. (1) and Eq. (3), and will thus be equivalent. Regardless of the ratio of the number of radials walls 108 on the inner side of each cell transition 124 to the outer side of each cell transition 124, the length of radial wall 108 on the inner side of cell transition 124 can be made equal to the inverse of the square of the ratio of current flowing through each radial wall 108 on the outer side of the cell transition 124 to the current flowing through each radial wall 108 on the inner side of cell transition 124, in order to implement the second embodiment.

Figure 6:
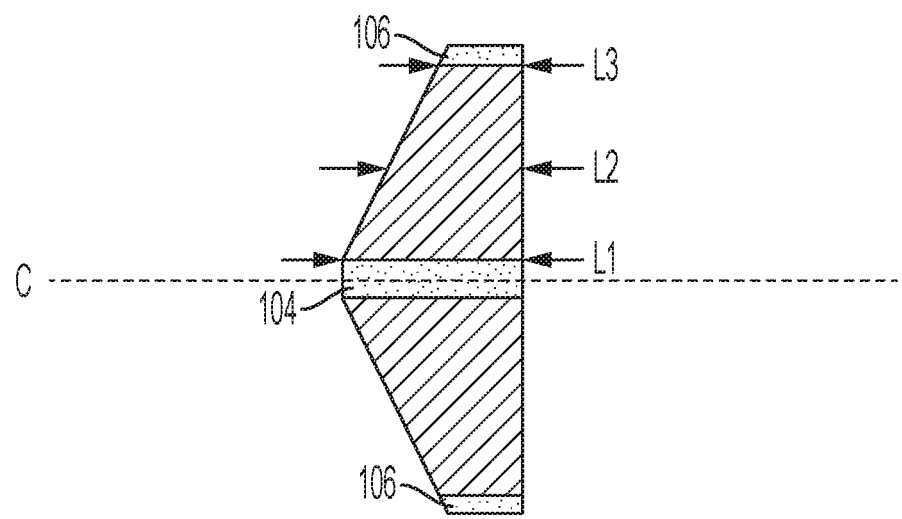
FIG. 6 depicts a simplified axial cross-section view of radial and angular walls of an electrical heater, according to an example.

In a third embodiment, as shown in FIG. 6 which is a cross-section taken in a plane along central axis C and bisecting the inlet face 130 of electric heater 100 the honeycomb is arranged in a generally conical shape, as opposed to a cylindrical shape shown in FIG. 2. For example, the axial length of the walls of the honeycomb body are increased toward the center axis C and decrease, progressively, toward the outer periphery of the honeycomb structure 102. Thus, directly adjacent the central electrode 104, the axial length of the honeycomb structure is longest, having a length represented as L1, while at the midpoint between the central electrode 104 and the outer periphery of the honeycomb structure, the axial length has diminished to L2. Finally, near to the outer periphery, the axial length has diminished to its shortest length, L3. Like the examples of FIG. 4 and FIG. 5, this example reduces the equivalent resistance of the honeycomb body toward the central axis C. In an alternative example, instead of reducing progressively, the axial length can change in steps, at, for example, each cell transition 124. Thus, turning to FIG. 1, in an alternate example, the axial length of the walls in the resistive region 128c can be made to be four times the length of the walls in the resistive region 128c. As a result, like the example of FIGS. 4A-5, the resistance of radial wall 108 on the inner side of cell transition 124 will be resistance R, while the resistance of each radial wall on the outer side of cell transition 124 will be resistance 4R. The heat generated by each radial can, therefore, be calculated by Eq. (1) for the radial walls 108 disposed in the inner resistive region 128 and Eq. (3) for the radial walls 108 disposed in the outer resistive region 128, and will thus be equivalent. In the example in which the axial length is varied at each resistive region 128, the relative axial length for each resistive region 128 can be similarly calculated as the inverse of the square of the ratio of the current flowing through each radial wall 108 on the outer side of cell transition 124 to the current flowing through each radial wall 108 on the inner side of cell transition 124.

Any of the embodiments described in connection with FIGS. 4A-6 can be implemented in any suitable combination. For example, rather than modifying resistive region 128c to be four times as thick or a quarter the length of resistive region 128d, resistive region 128c can instead be made to be twice as thick and half the length of resistive region 128d, yielding the same equivalent resistance as the individual examples of FIGS. 4A-6. Thus, the example of FIGS. 4A-4B can be combined with the example of FIG. 5 and/or the example of FIG. 6. Likewise, the example of FIG. 5 can be combined with the example of FIG. 6.

Furthermore, the thicknesses, lengths, and/or axial lengths of each resistive region 128 can be varied within a particular resistive region 128, to achieve a desired heat profile. For example, if a particular area of a resistive region 128 receives less exhaust than another area e.g., an area near the periphery of heater 100 the thickness of the radial walls 108 located within that area can be made thinner, in order to increase the heat generated at that particular area in relation to the remainder of the resistive region 128 and/or honeycomb structure 102. One of ordinary skill in the art, in conjunction with a review of this disclosure, will understand how such modifications may be made to account for non-uniform exhaust flow or other factors outside of the structure of the heater 100 that may influence the heat profile of heater 100.

Figure 7:
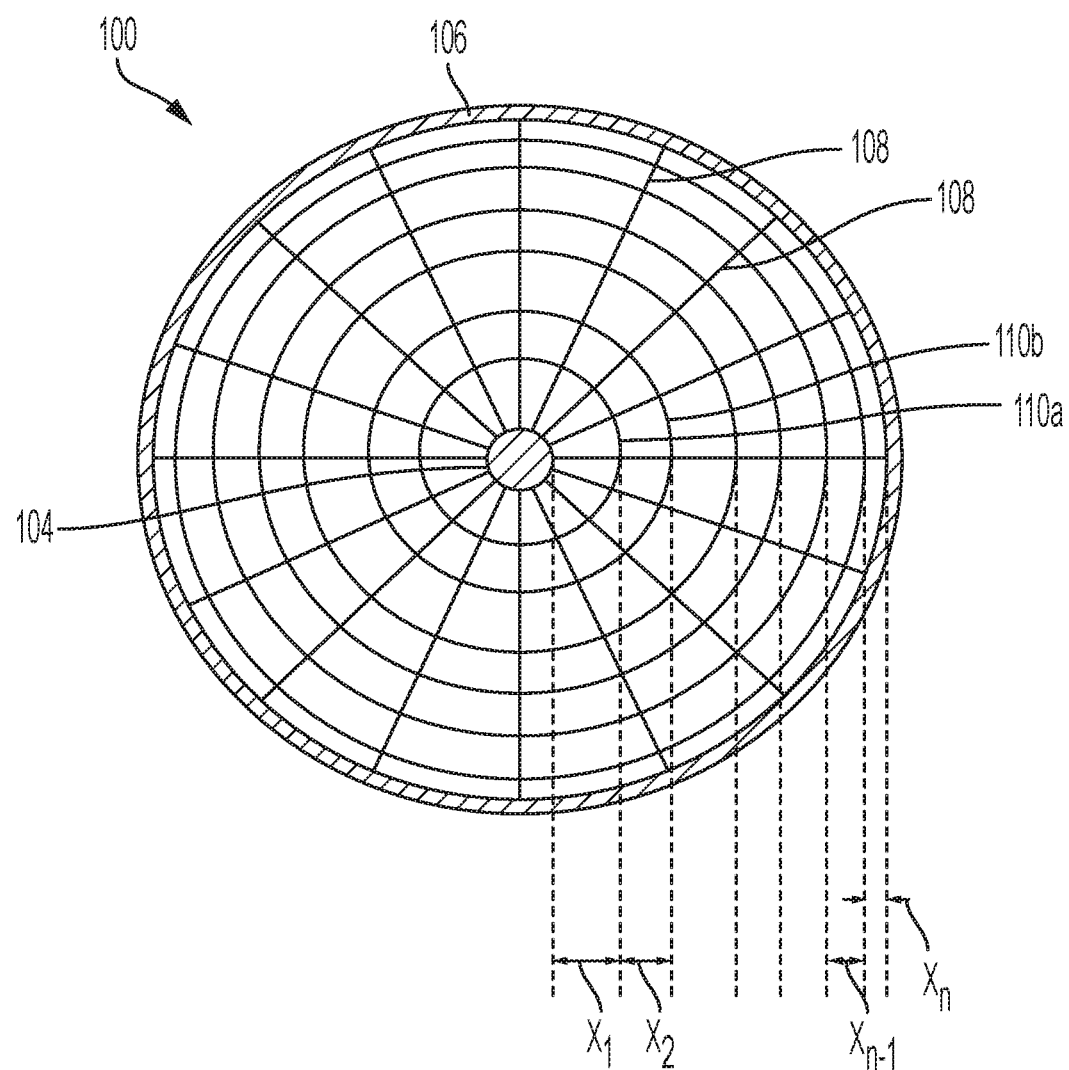
FIG. 7 depicts a cross-sectional view of an electrical heater having a radial honeycomb structure, according to an example.

In some embodiments, such as shown in FIG. 7, the cell transitions 124 are removed in order to eliminate the different resistive regions 128, and thus potentially simplify the manufacturing process and/or improve the heating profile. In order to maintain constant hydraulic diameter, the radial distance between radially adjacent angular walls 110 can be, moving from the central axis C toward the outer periphery, progressively narrowed, such that the spacing between angular walls 110 decreases the closer in radial proximity to outer skin 114. This is shown in FIG. 7, where the radial distance X1 between central axis C and the first angular wall 110a is greater than the radial distance X2 between the first angular wall 110a and the next radially adjacent angular wall 110b. The radial distance between each successive angular wall 110 can be reduced such that the following expression is true: Xn<Xn−1< . . . X2<X1, and such that the hydraulic diameter of each cell is kept substantially similar (±35% variation) as the distance between adjacent radial walls increases toward the outer periphery. As a result, and as shown in FIG. 7, honeycomb structure 102 comprises a higher number of angular walls 110 at the outer periphery than near the central axis C.

Figure 8:
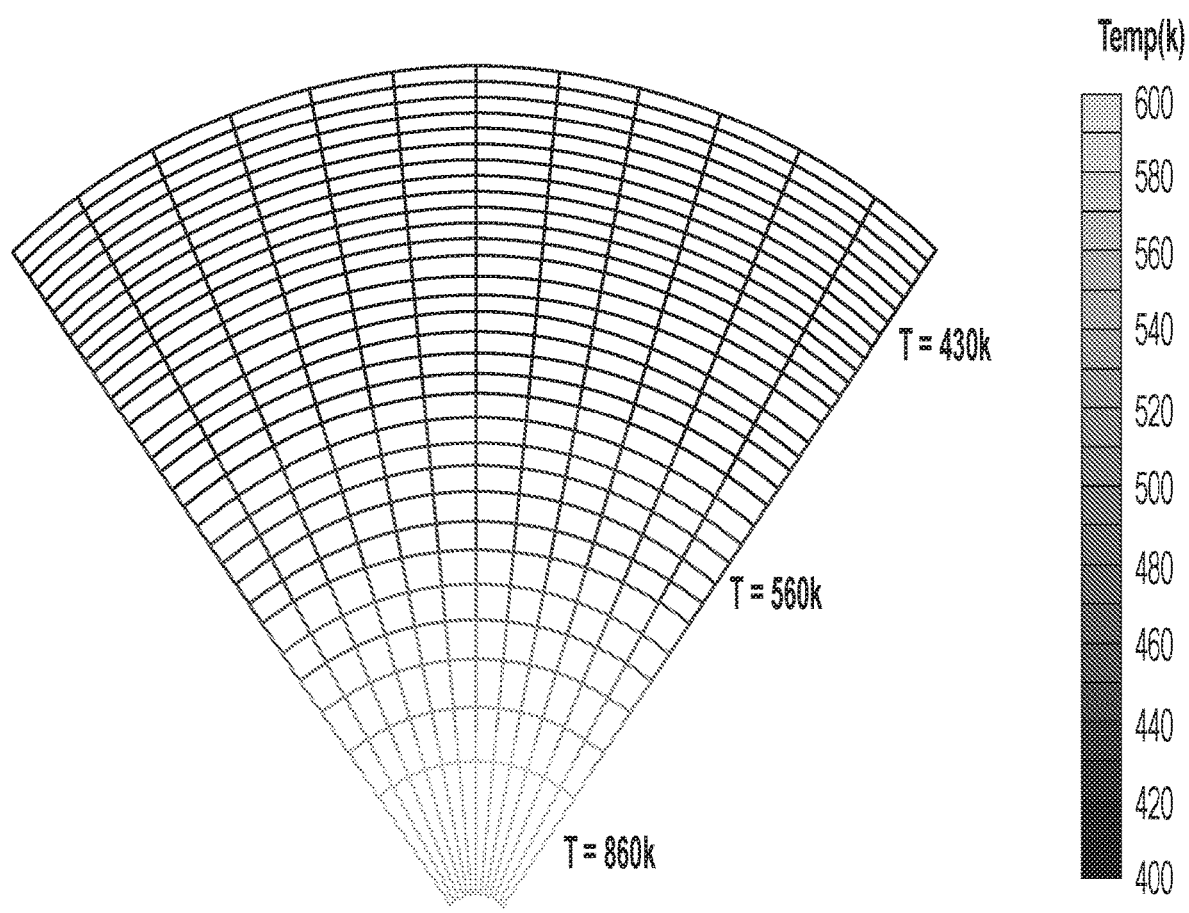
FIG. 8 depicts a heating profile of an electrical heater, according to an example.

An example of a thermal output that can be produced by the embodiment of FIG. 7 is illustrated in FIG. 8. Because the radial walls 108 represent the shortest path between the electrodes 104, 106, and thus carry the bulk of the current, the current density near the electrode 104 is greater than the current density at the outer periphery, as the radial walls 108 are spaced relatively close together near the central axis C, but far apart near the outer periphery due to their radial divergence. As a result, this embodiment is most beneficial in situations in which excess heat generation is desired near the center. For example, FIG. 8 depicts an example heat profile for a heater resembling the embodiment of FIG. 7. As shown, the thermal profile of FIG. 8 has a temperature of 860 K near the central electrode, 560 K at a midpoint between the central electrode and the outer periphery, and 430 K near the outer periphery, yielding a temperature differential of 430 K. The temperature values are provided for sake of discussion only and other temperatures can be achieved based on the particular material, geometry, voltage, and other parameters or characteristics of the heater.

Figure 9:
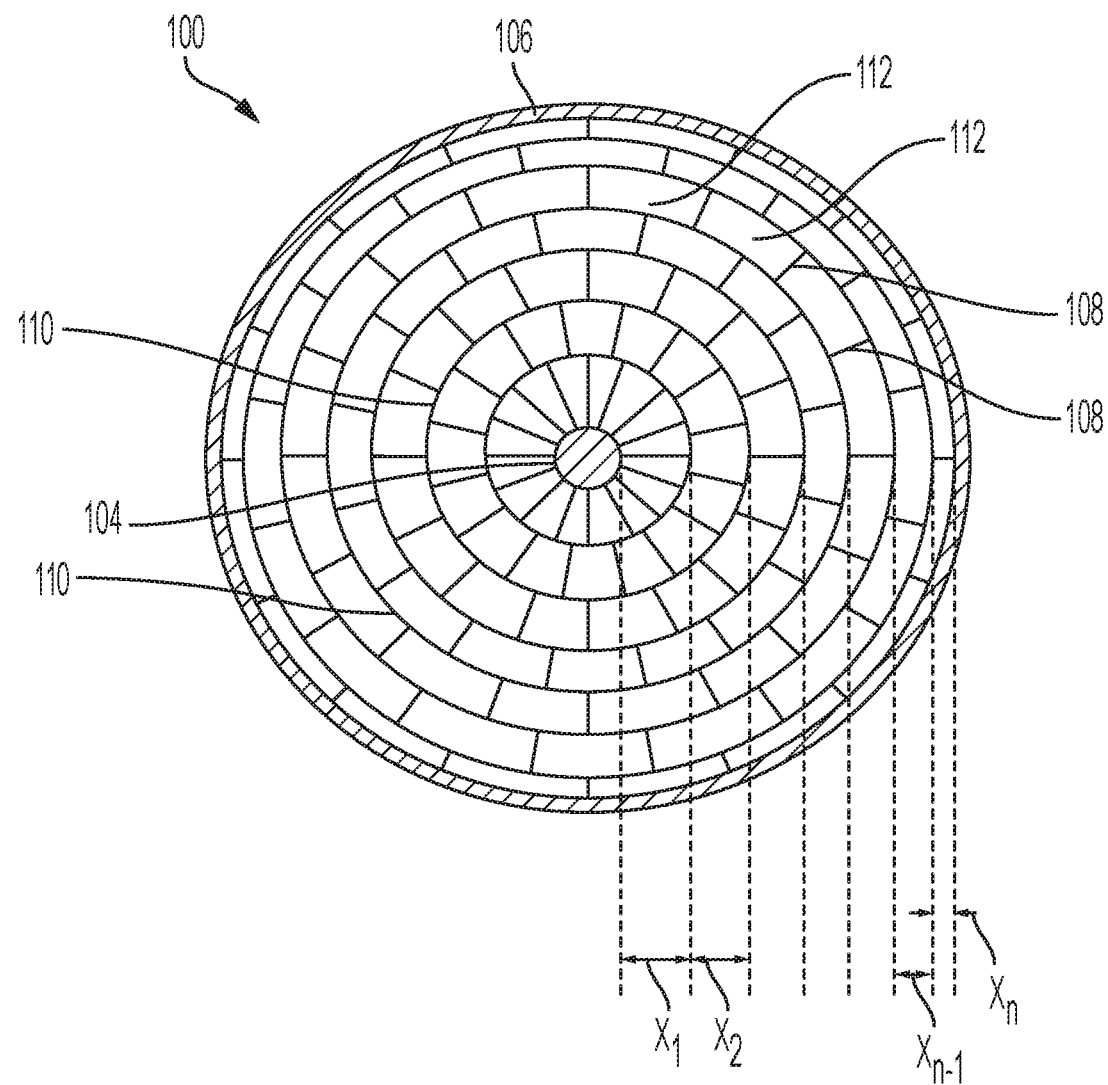
FIG. 9 depicts a cross-sectional view of an electrical heater having radial staggered cells, according to an example.
Figure 10:
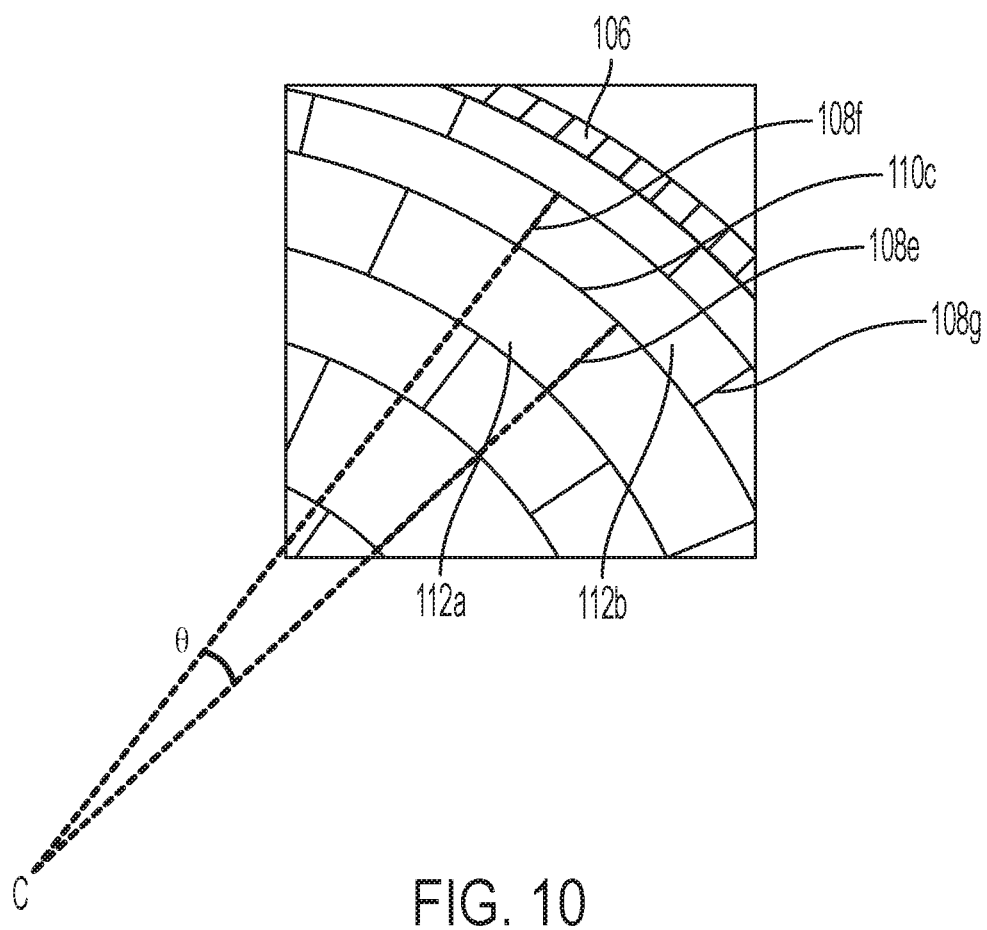
FIG. 10 depicts a partial cross-sectional view of an electrical heater having radial staggered cells, according to an example.

To improve temperature uniformity, the radial walls 108 can be staggered. For example, the radial walls 108 can be staggered at the intersections with each angular wall 110, such that radially adjacent ones of the cells 112 of honeycomb structure 102 are offset, arranging the cells 112 in a brick-like pattern, as shown in FIG. 9. Thus, as shown in FIG. 10 each radial wall 108 can be angularly offset from the radial walls 108 of radially adjacent cells by an angle θ0 having a vertex at central axis C. For example, radial wall 108e is offset by the angle θ from radial walls 108f and/or 108g because cell 112a, partially defined by radial wall 108e is radially adjacent to cell 112b, which is partially defined by radial walls 108f and 108g. Due to the radial adjacently of the cells 112a and 112b, each of the radial walls 108e, 108f, and 108g is commonly connected by the angular wall 110c, which angular wall 110c is commonly shared by the cells 112a and 112b.

Figure 11:
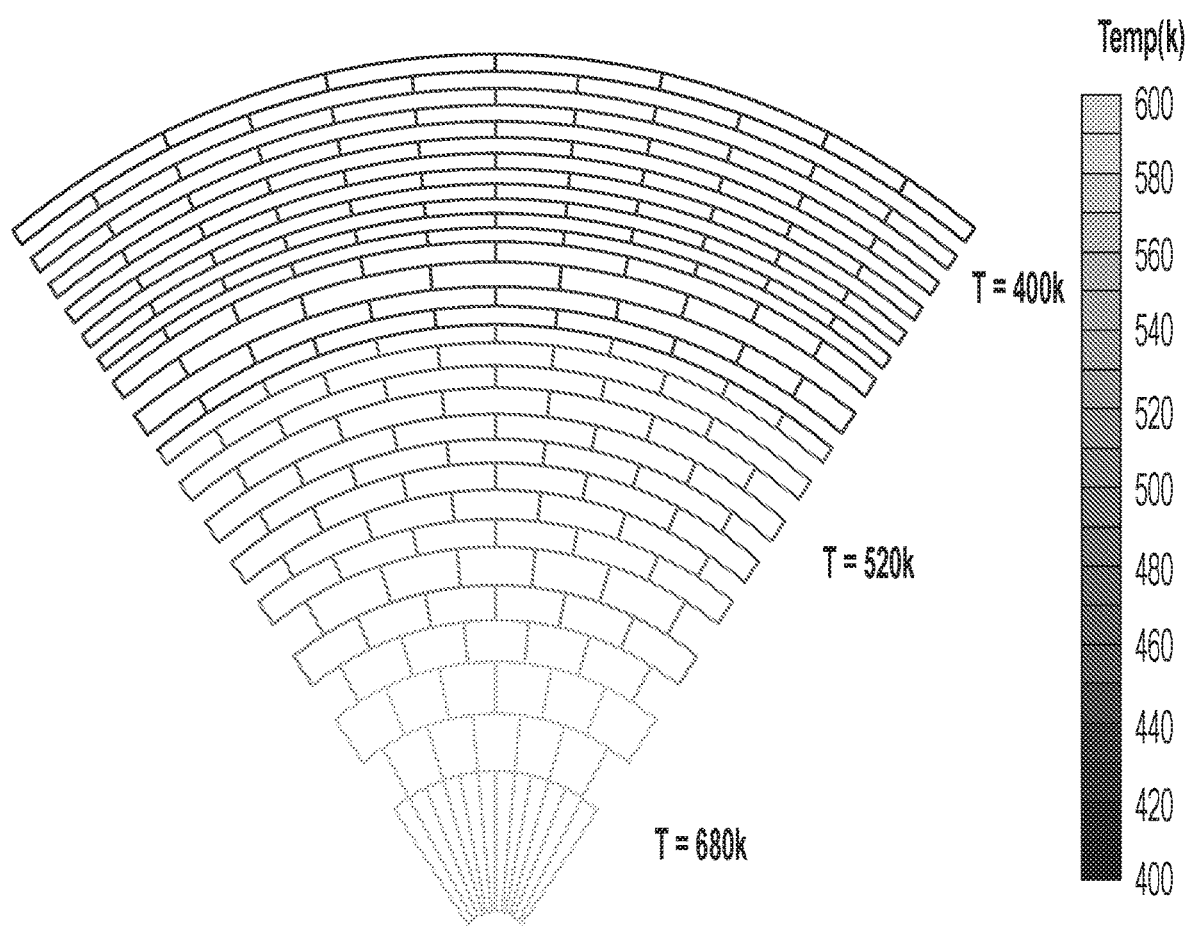
FIG. 11 depicts a heating profile of an electrical heater having radial staggered cells, according to an example.

The architecture of FIG. 9 eliminates any straight path for current to flow from the central electrode 104 to the peripheral electrode 106, forcing current to flow along the angular walls 110, thus causing more uniform heating throughout the heater, particularly near the outer periphery where the relative density of angular walls is greater. FIG. 11 shows an example of a temperature profile of a staggered honeycomb structure, e.g., that of FIG. 9, showing an improvement in the uniformity of the heat profile compared to the temperature profile of FIG. 8. Indeed, as shown, the structure of FIG. 11 has a temperature of 680 K near the central electrode, 520 K at a midpoint between the central electrode and the outer periphery, and 400 K near the outer periphery, yielding a temperature differential of 280 K.

The distance the current flows along the angular wall 110 will be determined, at least in part, by the angle between a given radial wall 108 and the nearest radial walls 108 that define the radially adjacent cells. That is, current will primarily flow along the portion of the angular wall 110 separating the radial walls 108, in connecting the shortest path between the electrodes 104, 106. Thus, if the two radial walls 108 are separated by only a small degree, the current will only flow along angular wall 110 over the short angular distance between the radial walls 108. By contrast, if the radial walls 108 are offset by a distance equivalent to half the width of a cell, (such as shown in FIGS. 9 and 10) each radial wall will be equidistant from two radial walls 108 opposite a single angular wall 110, and, thus, equal current will flow from both radial walls 108, along the entire angular wall 110 (all other aspects of the cells 112 being equal). Accordingly, the amount of current flowing and the heat generated along the angular walls 110 can be adjusted, by varying the offset of the radial walls 108.

Figure 12:
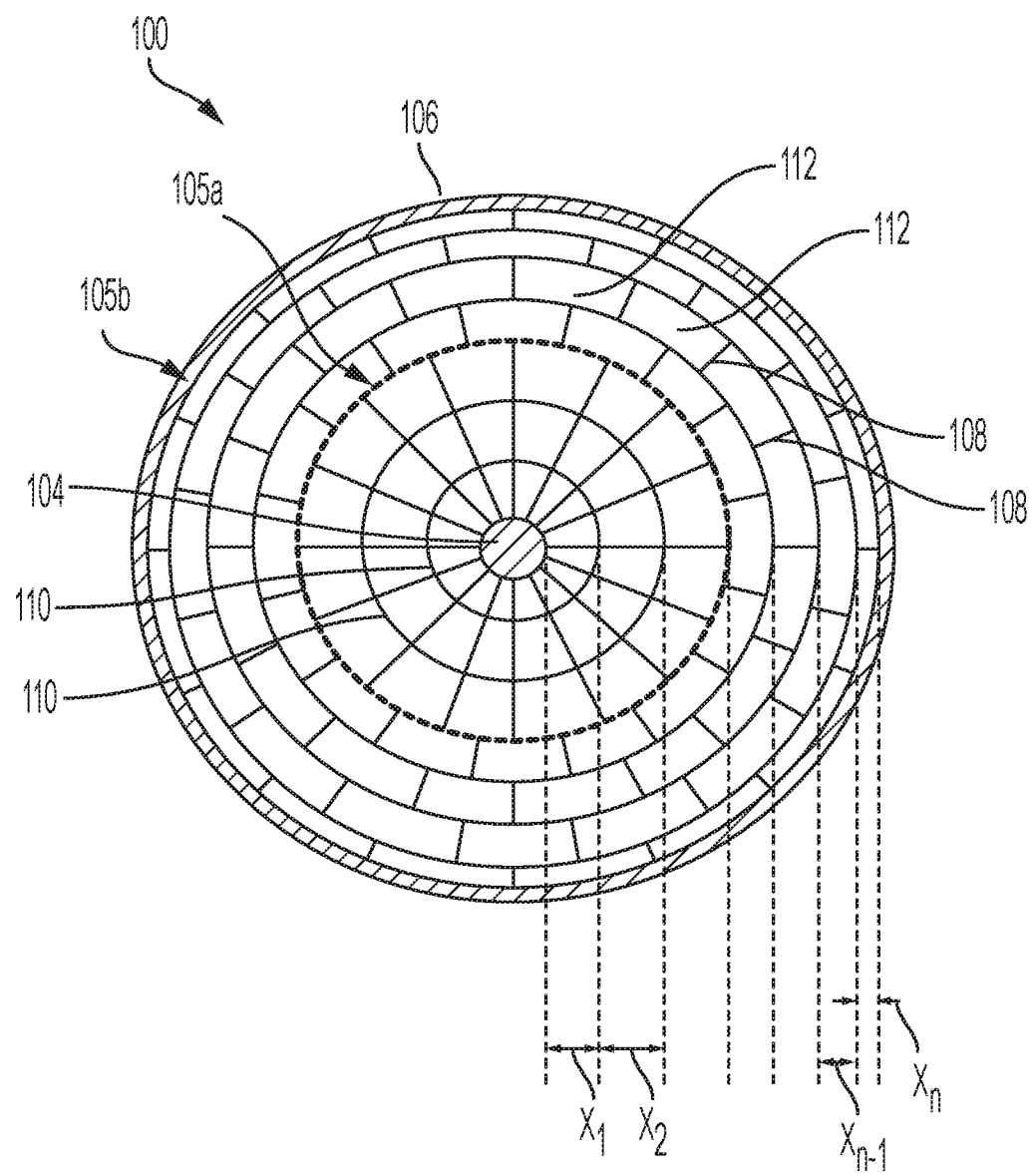
FIG. 12 depicts a cross-sectional view of electrical heater having staggered cells proximate to an outer periphery, according to an example.

The example of FIGS. 9 and 10, and the resulting heat profile of FIG. 11, can still feature greater heat generation near the central axis C than required in some embodiments. That is, for example, even more uniform temperature profiles may be beneficial for heating flows of gas that are uniform in flowrate across the face of the heater 100. Thus, to further increase the uniformity of the temperature profile, the radial walls near the center of the heater 100 can be aligned with the adjacent radial walls to prevent current flow in the angular walls near the core, whereas the radial walls 108, and, accordingly, the cells 112, near the outer periphery can be offset. Thus, as shown in the example of FIG. 12, the cells in a first region 105a resemble the embodiment of FIG. 7 in which the radial walls 108 propagate past multiple cells 112 in straight radial line, while the radial walls 108 in a second region 105b resemble that of the embodiment of FIG. 9, in which the radial walls 108 are staggered at each intersection of the radial walls 108 with the angular walls 110.

The offset between radially adjacent cells 112 can be varied to achieve a desired heat profile. For example, if a particular area of heater 100 receives less exhaust than another area e.g., an area near the periphery of heater 100 the offset between radially adjacent cells 112 can be increased to force more current to flow thorough the angular walls 110 in a particular area. One of ordinary skill in the art, in conjunction with a review of this disclosure, will understand how such modifications may be made to account for non-uniform exhaust flow or other factors outside of the structure of the heater 100 that may influence the heat profile of 100.

In some embodiments, particularly those in which the flow of gas is expected to be non-uniform across the inlet face of the heater 100, the cell dimensions within a particular area can be set to compensate for increased exhaust flow in certain areas. For example, the central area (i.e., the area disposed directly adjacent the central axis C, such as region 105a in FIG. 12) may receive increased exhaust flow with respect to the exhaust flow received at the outer periphery (e.g., as a result of the design of the exhaust treatment system installed on a vehicle, for example). Accordingly, the cells 112 in this example can be divided into a first group that is disposed in the region directly adjacent the central axis (e.g., the region 105a in FIG. 12), and a second group that is disposed in a second region annularly arranged about the first group (e.g., the region 105b in FIG. 12). The hydraulic diameters of the cells 112 of the first group can be smaller or larger than the hydraulic diameters of the cells 112 of the second group. For example, by reducing the hydraulic diameter in the group of cells in the first radially inner region, the surface area of the walls, and thus the amount of catalytic material, exposed to the flow at the center of the heater can be increased to maximize the catalytic effect in this area. Advantageously, this can be utilized to provide an increased temperature and/or catalytic loading in areas of higher gas flowrate. In other examples, the hydraulic diameter of other regions can be accordingly increased or decreased to accommodate the particular flow profile experienced, or expected to be experienced, by the heater 100 during use.

Figure 13:
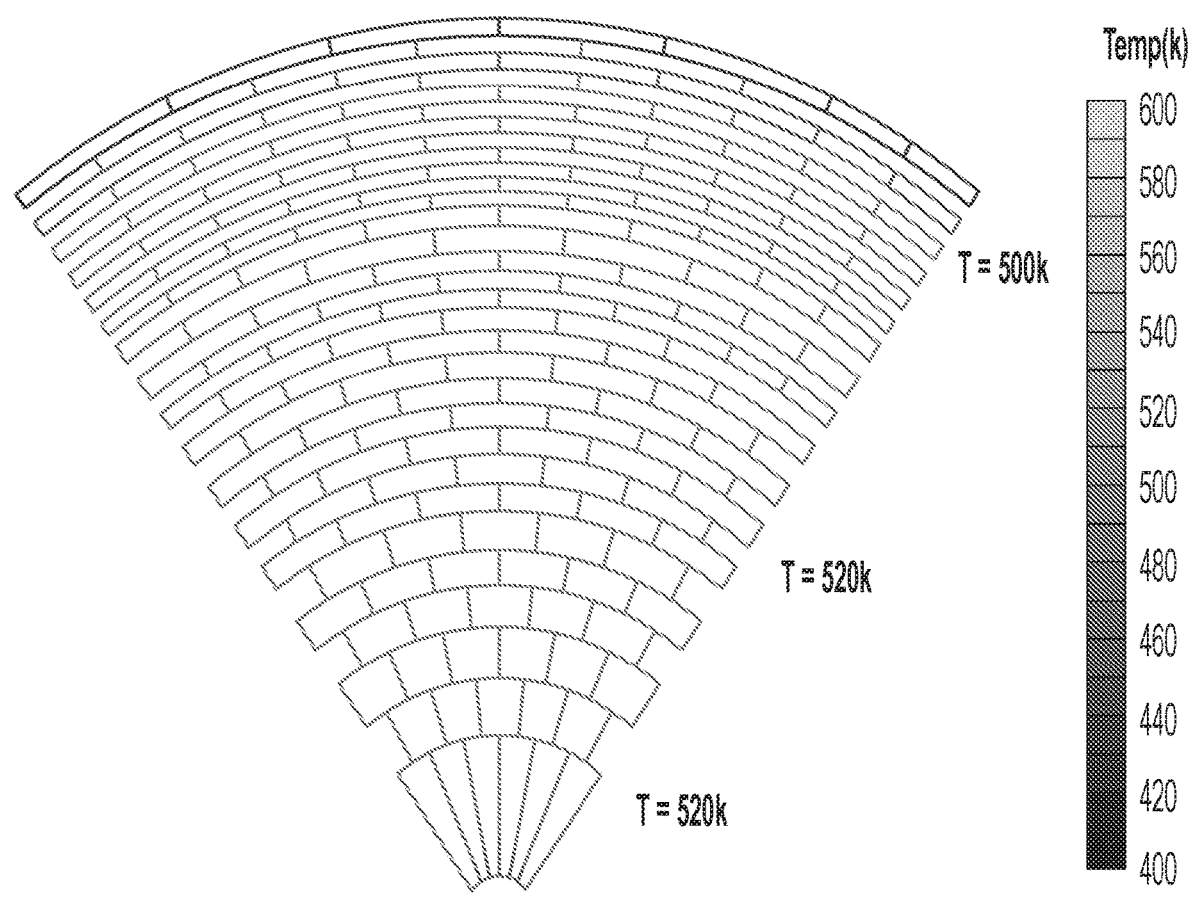
FIG. 13 depicts a heating profile of an electrical heater having radial staggered cells and thickened radial walls, according to an example.

In other examples, the modifications described in connection with FIGS. 4A-6 can be combined with the design(s) of FIGS. 9-12, in various possible ways, to result in a more uniform heat profile. For example, the radial wall thickness of the design of FIG. 4 can be increased, such that the radial walls 108, in general, are thicker (e.g., twice as thick) as the angular walls 110, resulting in greater heating at the angular walls (e.g., by a factor of two). Thus, at the outer periphery, where the concentration of angular walls 110 is higher, the heat generation is greater, resulting in the heat profile of FIG. 13, which is particularly uniform. As shown in FIG. 13, a staggered cell design with increased radial wall thickness has a temperature of 52.0 K near the central electrode, 52.0 K at a midpoint between the central electrode and the outer periphery, and 500 K near the outer periphery, yielding a temperature differential of 20 K.

Figure 14:
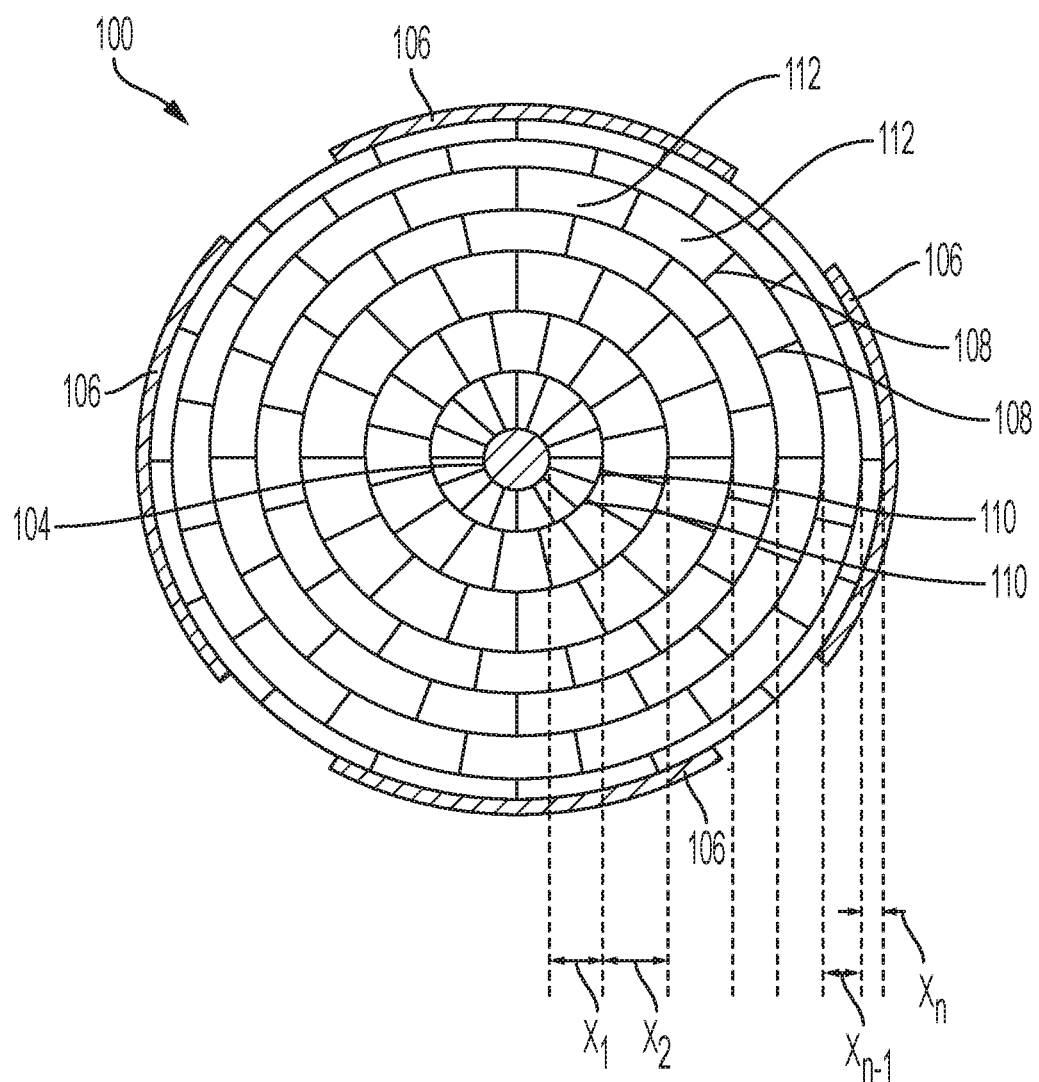
FIG. 14 depicts a heating profile of an electrical heater having a peripheral electrode covering only portions of an outer skin, according to an example.

FIG. 14 illustrates an embodiment that comprises a plurality of the peripheral electrodes 106. For example, because current will flow from central electrode 104 to the peripheral electrode(s) 106, the temperature profile can be adjusted by sizing and positioning the peripheral electrode(s) 106 where relatively higher temperatures are desired. For example, one or more peripheral electrodes 106 can be positioned to induce a current flow through cells 112 that are expected to receive greater rate of gas flow.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples can be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An electrical heater for heating an exhaust flow comprising:
   a honeycomb body comprising:
      a honeycomb structure comprising a central axis extending longitudinally therethrough and a plurality of interconnected walls, the interconnected walls comprising:
         a plurality of radial walls, each radial wall extending at least partially along a radius of the honeycomb body between the central axis and an outermost periphery of the honeycomb body; and
         a plurality of angular walls arranged concentrically with respect to the central axis and spanning between the radial walls; and
      a plurality of cells defined by the interconnected walls;
   a first electrode disposed at the central axis; and
   a second electrode disposed radially outwardly of the central axis and in electrical communication with the first electrode via one or more of the interconnected walls that are located between the first electrode and second electrode, wherein the honeycomb body comprises a first resistive region separated from a second resistive region by a transitional angular wall, wherein the first resistive region comprises fewer radial walls than the second resistive region, the first resistive region being located nearer to the central axis than the second resistive region and both the first resistive region and the second resistive region being located between the first and second electrodes.

2. The electrical heater of claim 1, wherein a radial distance between radially consecutive angular walls of the plurality of angular walls decreases in a radial proximity to the outer periphery of the honeycomb body such that a hydraulic diameter of each cell is substantially similar.

3. The electrical heater of claim 1, wherein a first group of the plurality of cells is in a first region directly adjacent to the central axis, wherein a second group of the plurality of cells is disposed in a second region radially outwardly of the first region, wherein a first hydraulic diameter of each cell of the first set of the plurality of cells is less than a second hydraulic diameter of each cell of the second set of the plurality of cells.

4. The electrical heater of claim 1, wherein each radial wall of a first cell of the plurality of cells is angularly offset with respect to the radial walls of a second cell of the plurality of cells that is radially adjacent to the first cell.

5. The electrical heater of claim 1, wherein the first resistive region and second resistive region are bounded by the transitional angular wall and one of the first electrode, the second electrode, or a second transitional angular wall.

6. The electrical heater of claim 1, wherein the radial walls of the first resistive region are proportionally thicker than the radial walls of the second resistive region, such that, when carrying current between the first and second electrodes, heat generated by each radial wall of the first resistive region is substantially equivalent to heat generated by each radial wall of second resistive region.

7. The electrical heater of claim 1, wherein the radial walls of the first resistive region are proportionally shorter than the radial walls of the second resistive region, such that, when carrying current between the first and second electrodes, heat generated by each radial wall of the first resistive region is substantially equivalent to heat generated by each radial wall of second resistive region.

8. The electrical heater of claim 1, wherein the radial walls of the first resistive region are proportionally axially longer than the radial walls of the second resistive region, such that, when carrying current between the first and second electrodes, heat generated by each radial wall of the first resistive region is substantially equivalent to heat generated by each radial wall of second resistive region.

9. An electrical heater, for heating an exhaust flow comprising:
a honeycomb body comprising:
a honeycomb structure comprising a central axis extending longitudinally therethrough and a plurality of interconnected walls, the interconnected walls comprising:
a plurality of radial walls, each radial wall extending at least partially along a radius of the honeycomb body between the central axis and an outermost periphery of the honeycomb body; and
a plurality of angular walls arranged concentrically with respect to the central axis and spanning between the radial walls; and
a plurality of cells defined by the interconnected walls;
a first electrode disposed at the central axis; and
a second electrode disposed radially outwardly of the central axis and in electrical communication with the first electrode via one or more of the interconnected walls that are located between the first electrode and second electrode,
wherein the radial walls are thicker than the angular walls.

10. The electrical heater of claim 1, wherein the second electrode is disposed at an outer skin disposed about the outer periphery of the honeycomb structure.

11. An exhaust treatment system comprising the electrical heater of claim 1 and an exhaust treatment device is positioned downstream of the electrical heater.

12. The exhaust treatment system of claim 11, wherein the exhaust treatment device comprises a substrate loaded with a catalytic material, a particulate filter, or a combination.

13. A method for heating a catalytic material, comprising the steps of:
applying an electric potential difference across a first electrode located at a central axis of a first honeycomb body and a second electrode located on the honeycomb body radially outwardly from the first electrode to heat an exhaust stream flowing through the first honeycomb body, wherein the honeycomb body comprises a plurality of intersecting walls comprising a plurality of radial walls, each radial wall extending at least partially along a radius of the honeycomb body between the central axis and an outermost periphery of the honeycomb body, at least some of the plurality of radial walls angularly spaced from each other about the central axis and a plurality of angular walls arranged concentrically with respect to the central axis and spanning between the radial walls, wherein the electric potential difference creates a flow of current through the intersecting walls located between the first electrode and the second electrode that generates resistive heating in the intersecting walls; and
directing the exhaust stream to a second honeycomb body downstream of the first honeycomb body, wherein the second honeycomb body comprises the catalytic material,
wherein the honeycomb body comprises a first resistive region separated from a second resistive region by a transitional angular wall, wherein the first resistive region comprises fewer radial walls than the second resistive region, the first resistive region being located nearer to the central axis than the second resistive region and both the first resistive region and the second resistive region being located between the first and second electrodes.

14. The method of claim 13, wherein the radial walls of the first resistive region are thicker than the radial walls of the second resistive region, such that the equivalent resistance of the first resistive region and the second resistive region are substantially similar.

15. The method of claim 13, wherein the radial walls of the first resistive region are shorter than the radial walls of the second resistive region, such that, when carrying current between the first and second electrodes, the heat generated by each radial wall of the first resistive region is substantially equivalent to the heat generated by each radial wall of the second resistive region.

16. The method of claim 13, wherein the radial walls of the first resistive region are axially longer than the radial walls of the second resistive region, such that, when carrying current between the first and second electrodes, the heat generated by each radial wall of the first resistive region is substantially equivalent to the heat generated by each radial wall of second resistive region.

17. The method of claim 13, wherein the radial walls are thicker than the angular walls.

18. The method of claim 13, wherein the second electrode is disposed at an outer skin disposed about the outer periphery.

* * * * *